June 13, 1967     D. C. WESTERVELT ET AL     3,325,590

INSULATED CONDUCTORS AND METHOD OF MAKING THE SAME

Filed March 23, 1964

WITNESSES
Theodore F. Wrobel
James F. Young

INVENTORS
Dean C. Westervelt
and Charles H. Vondracek
BY Alex Mich Jr.
ATTORNEY

United States Patent Office 3,325,590
Patented June 13, 1967

3,325,590
INSULATED CONDUCTORS AND METHOD
OF MAKING THE SAME
Dean C. Westervelt, Monroeville, and Charles H. Vondracek, Pittsburgh, Pa., assignors to Westinghouse Electric Corporation, Pittsburgh, Pa., a corporation of Pennsylvania
Filed Mar. 23, 1964, Ser. No. 353,708
11 Claims. (Cl. 174—121)

This invention relates to conductors, such as wire, having an inorganic insulation thereon and in particular it concerns a method of providing inorganic insulated wire as well as the novel products thereby obtained.

Recently commercialized insulated magnet wires for high temperature use have been found to be deficient in one or more of the important properties of interest. These properties include flexibility to enable processing into electrical equipment, adhesion of the insulation to the conductor after exposure to high temperatures, cut-through resistance and electrical strength. It is our opinion that these drawbacks are due both to the manner of insulating such conductors as well as to the materials used for such purposes heretofore.

The primary object of the present invention is to provide a method for preparing inorganic insulated wire that is easily practiced and results in products that are flexible, have adherent coatings at high temperature, that have good cut-through resistance and have good electrical properties.

Another object of the invention is to provide inorganic insulated conductors characterized by a combination of outstanding properties.

Other and further objects of the invention will be apparent from the following detailed description and discussion of the invention along with the attached drawing in which.

Figure 3:
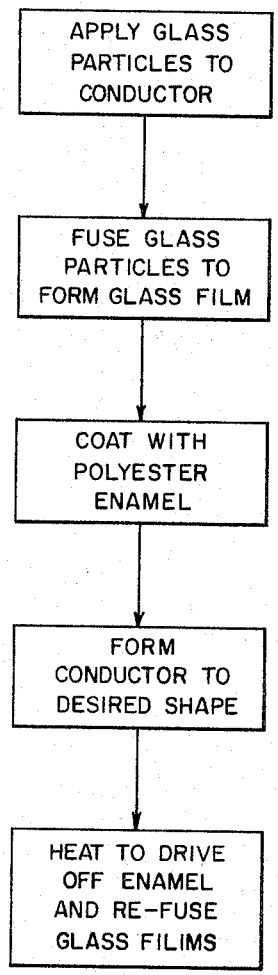
FIG. 3 is a flow chart illustrating the method steps of this invention.

The objects of this invention are attained and outstandingly useful inorganic insulated conductors result by providing a smooth glass insulating film on a conductor and covering the glass film with an organic enamel. A refractory overcoat, applied either before or after the enamel, may also be used. If applied after the enamel, then the refractory composition should include a portion of the enamel so that a resinous film is provided to retain the refractory in place. With the coatings thereby obtained, the wire is shaped as desired for the contemplated use. Thereafter, it is fired to remove organic materials and to reestablish a complete glass film in the event cracking occurs during processing.

Thus it is of the essence of one embodiment of this invention to apply separately to a conductor (1) a glass insulating coating, (2) another coating to serve to retain the glass at the conductor surfaces while handling and processing the conductor to its final form; and (3) a coating of refractory materials that provide particular physical strength and cut-through resistance.

A wide variety of glass compositions can be used to provide the glass coating that is applied directly on the surface of the conductor in this invention. Indeed any glass can be used (1) that provides good electrical insulating characteristics at elevated temperatures of about 500° C.; (2) that fuses at a temperature on the order of about 600° to 750° C.; (3) that has a coefficient of thermal expansion sufficiently high and matched to that of the conductor to minimize or avoid cracking, crazing or spalling of the glass during thermal cycling over the temperatures encountered in use; and (4) that adheres sufficiently to remain on the conductor upon being bent in a semi-circle with a radius of at least 25 times the diameter of the bare conductor. While any glass composition that results in a fused product that meets the foregoing specifications can be used, we prefer to employ lead oxide-boric oxide base compositions, for example 80 to 92 percent PbO and 8 to 20 percent $B_2O_3$, to which there has been added 0.5 to 5 percent of other oxides to provide a desired property. For example 1 percent of nickel oxide is used in the glass composition when the conductor is copper clad stainless steel for purposes of improved adhesion.

The well mixed glass mixture is fused, as by heating to above 750° C., for example 800° to 1100° C., and then quenched as by pouring it into water to shatter it. The resulting frit is ball milled, either wet or dry, to a fine particle size suitably about minus 100 mesh (Tyler) or finer. For application to a conductor, a water slurry of the glass fines is made, and is applied by dip-coating or other procedure. About ½ to 5 parts of water are used per part of glass composition. It is desirable to include about 0.5 to 5 percent of a conventional binder, such as methylcellulose gum, in the slurry. Thereafter the frit on the conductor is heated to fuse the adhering particles and form a smooth glass film. This is readily accomplished by heating the dried frit-coated wire to a red heat in a radio-frequency coil at a temperature on the order of 600° to 750° C., depending on the specific composition used.

An organic resin enamel generally is applied after the fused glass film has been provided, and may be applied directly thereon, or over another inorganic coating that serves to provide substantial physical resistance. The organic resin component includes those polymeric resins which will form a tough, flexible, abrasion resistant adherent coating on the glass coated metallic conductor. Further, the resinous material must, upon heating to its decomposition temperature, be clean-burning, and be substantially all removed by volatilization from the applied coating, and must not leave any traces of carbon residue on the inorganic glass or other insulating coating. It will be apparent that any carbon residue on the insulating coating is undesirable since carbon is an electrically conducting material.

Any organic resin meeting the above requirements can be employed satisfactorily in carrying out this invention without departing from its scope. Certain polyester resins meet the above requirements and have been employed satisfactorily in this invention. These polyester resins decompose and are substantially completely removed from the applied coating at temperatures of from about 300° to 460° C. and preferably about 425° to 460° C., depending on the particular materials involved.

The polyester resins employed in this invention are prepared by reacting (A) one mol of a dicarboxylic acid component with (B) from about 1.2 mols to 1.5 mols of a mixture of polyhydric alcohols comprised of from (1) about 0.95 to 0.50 mol-fraction of at least one dihydric saturated aliphatic alcohol and (2) from about 0.05 to 0.50 mol-fraction of at least one polyhydric saturated aliphatic alcohol having at least three reactive hydroxy groups per molecule. The reaction is preferably carried out in the presence of from 0.005 percent to 2 percent by weight, based on the total weight of the reactants, of an esterification catalyst. Suitable esterification catalysts are well known in the art and include metal salts of organic acids, metal oxides, and metal chelates.

The dicarboxylic acid component (A) used in the preparation of the polyester can be isophthalic acid, dialkyl esters of isophthalic acid, dialkyl esters of terephthalic acid, and mixtures of two or more of the foregoing.

The dialkyl esters of terephthalic acid or of isophthalic acid that can be employed in carrying out this invention include those esters in which the alkyl groups contain from 1 to 4 carbon atoms, for example, methyl, ethyl, propyl, isopropyl, butyl, isobutyl, and t-butyl. Dimethyl terephthalate and diethyl terephthalate are specific examples of dialkyl esters of terephthalic acid while dimethyl isophthalate, diethyl isophthalate, and diisopropyl isophthalate are specific examples of dialkyl esters of isophthalic acid.

Dihydric saturated alcohols (1) that comprise a portion of the mixture of polyhydric alcohols (B) which are suitable for preparing the polyesters for use in this invention comprise dihydric saturated aliphatic alcohols having from 2 to 8 carbon atoms per molecule. Examples of such alcohols include, 1,2-ethanediol; 1,2-propanediol; 1,3-propanediol; 1,2-butanediol; 1,3-butanediol; 2,3-butanediol; 2-methylpropane-1,2-diol; 1,4-butanediol; and 1,6-hexanediol.

Examples of polyhydric saturated aliphatic alcohols (2) having at least three reactive hydroxy groups per molecule which comprise the other portion of the mixture of polyhydric alcohols (B) include glycerol; 1,1,1-trimethylolpropane; 1,1,1 - trimethylolethane; 1,2,3 - butanetriol; erythritol; and pentaerythritol.

Highly satisfactory materials for use as the esterification catalyst in preparing the polyester include salts or organic acids selected from the group consisting of saturated and unsaturated aliphatic acids, cyclic acids, and aromatic acids. Examples of such catalysts include linolates, resinates, naphthenates, acetates, aromatic benzoates, octoates, tall oil acids, and stearates of metals including aluminum, calcium, cesium, chromium, cobalt, copper, lead, manganese, nickel, tin, titanium, vanadium, zinc, and zirconium. Two or more metal salts can be employed jointly as the catalyst. Other suitable catalysts such, for example, as metal acetyl acetonates can be employed. Titanium acetyl acetonate is a specific example of such a catalyst. Other suitable catalysts include lead oxide and the oxides and carbonates of the alkali and alkaline earth metals including sodium carbonate, calcium oxide, and magnesium oxide.

The resinous polyesters employed in this invention can be prepared in accordance with usual esterification procedures as, for example, by heating a mixture of the acidic components, polyhydric alcohols and catalyst at a temperature of from about 150° to 250° C. In many instances, more complete esterification is obtained when the relatively low boiling point alcohol formed during the esterification reaction is removed by carrying out the esterification in the presence of an organic liquid such as m- or p-cresol or the like, and by passing a sparging gas such as nitrogen or carbon dioxide through the reaction mixture.

For the purposes of this invention the polyester is utilized in solution form. Thus the polyester is dissolved in a suitable solvent. A typical suitable solvent is one comprising a mixture of cresols and hydrocarbons having a boiling point range of from about 135° C. to 250° C. together with certain monohydric alcohols. More specifically, mixtures of solvents comprising from 40 to 50 percent by weight of a phenol such as cresol or phenol, or mixtures thereof, such as a mixture of phenol and cresol in equal parts, can be combined with one or more of the following: ethanol, isopropanol, propanol, monochlorobenzene, xylol, toluol, and petroleum hydrocarbon distillates having boiling points within the range of from about 130° to 200° C. Ordinarily, the polyester solution used will comprise from about 10 to 40 parts by weight of the polyester resin and from about 90 to 60 parts by weight of solvent.

For many applications greater cut-through resistance is needed than that obtained by using only the glass film plus enamel covering. Such additional physical resistance is provided in this invention by applying an additional coating comprising fiberglass serving followed by a sealing coating of the polyester resin containing refractory constituents or glass frit. It can also be attained by using the fused glass film partially as an adhesive and applying refractory materials directly thereon, and thereafter applying the polyester enamel. Further, it can be achieved by applying a coating comprising an admixture of the polyester enamel and refractory materials plus glass. The refractory materials suitable for these purposes comprise the oxides and silicates of metals of the group consisting of calcium, barium, magnesium, titanium, cadmium, aluminum, zinc, lead, chromium and zirconium. Typical examples of these materials include alumina ($Al_2O_3$), silica ($SiO_2$), mica, calcined clay, zirconium silicate ($ZrSiO_4$), titania ($TiO_2$), zirconia ($ZrO_2$), chromium oxide ($Cr_2O_3$), barium oxide (BaO), calcium oxide (CaO), magnesium oxide (MgO) and mixtures thereof. The glasses hereinbefore indicated may also be used in these particular coatings. Where admixtures of the polyester enamel, a refractory and glass are used, such mixtures are generally composed of 40 to 60 percent of the organic resin component, from 20 to 40 percent of the refractory material, and from 10 to 30 percent of the glass composition. These coating compositions are applied to the glass coating or enamel coating on the metallic conductor in the form of a liquid suspension. Thus, the desired amount of the polyester resin is first dissolved in a suitable solvent, as indicated hereinbefore, and the desired amounts of refractory material and glass in finely divided form are added. The mixture is then ball-milled for a period of time of from about 12 hours to 48 hours. The resulting mixture or liquid suspension can be easily and readily applied to metallic wire conductors in conventional wire coating apparatus.

As noted, a separate coating of refractory material can be used to impart particular physical cut through resistance. Such coatings are applied directly on the glass film, and are thereafter covered with the enamel or a refractory-enamel admixture. Coating with refractory materials is readily accomplished by forming a slurry of the refractory, e.g. ground mica, alumina or the other oxides or silicates noted above, water and about 1 to 5 percent of a conventional binder, and coating the glass coated wire by immersion thereof in the slurry. After drying, the wire is again heated to fuse the glass, thereby tightly joining the refractory particles to the glass which adheres to those particles. The polyester base enamel is then applied over the refractory coating as before.

After the various individual coatings have been applied, the coated conductor is shaped or wound on a coil form to the desired configuration. It is then subjected to a heat treatment to remove the organic portion of the coatings and to re-fuse the glass coating. This is accomplished by heating gradually the coated wire in an oven at least to about 450° C. and maintaining that temperature until substantially all the polyester and other organic materials are removed. The time required is usually about ½ hour to 2 hours or more. Air flow through the oven is recommended to aid in removing the volatile constituents during this heating period. Then the temperature is raised to about 600° to 750° C. to fuse the glass. This procedure effectively removes the organics and re-establishes continuity of the inorganic coating if handling and shaping cause fracture.

Figure 1:
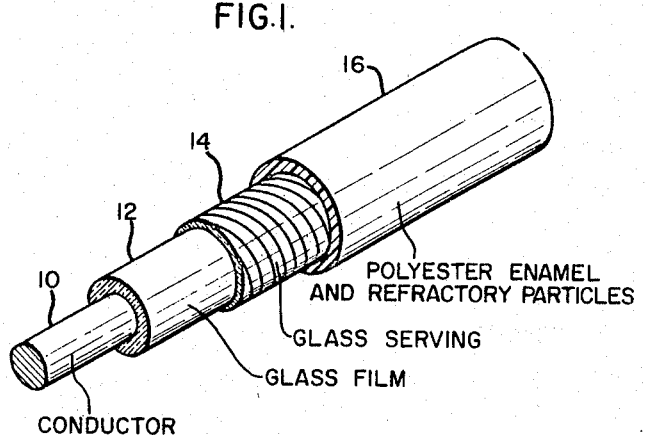
FIG. 1 is a fragmentary perspective view of a conductor being processed in accordance with this invention.

Conductors coated in the foregoing manner are exemplified in the attached drawing to which reference may now be made. In FIG. 1, there is shown a conductor 10 in the form of a wire of circular cross section. Directly on its surface is a first coating 12, specifically a fused glass film. Following one embodiment of the invention, a glass serving 14 is wound over the glass film 12. Over the serving is an enamel coating 16 formed of an admixture of the polyester base enamel and refractory constituents set forth hereinbefore.

In this state, the conductor shown in FIG. 1 can be wound on a suitable wire-forming mandrel to shape it to its desired configuration. Under some circumstances, the glass coating will crack. However, in this invention, the glass coating is separate from the other coating materials. The enamel coating, on the other hand, will not crack but will maintain a continuous film over the glass coated conductor and thereby retain directly in place on the conductor any portion of the glass that has broken. Accordingly, after forming, when the enamel is removed by decomposition, the temperatures reached are sufficiently high to lightly fuse the glass again thereby re-establishing the continuous glass film.

Figure 2:
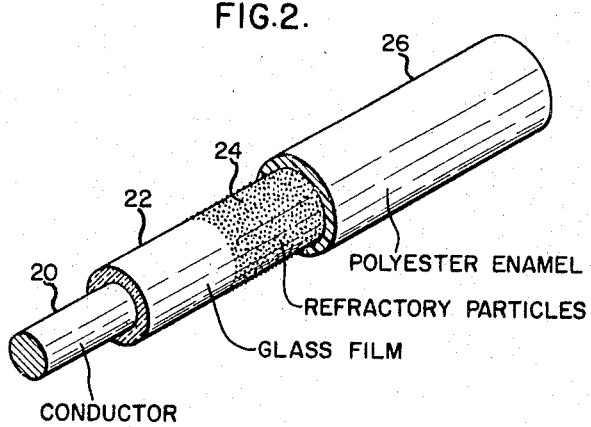
FIG. 2 shows a fragmentary perspective view of a second embodiment of the invention.

Referring now to FIG. 2, there is shown a conductor 20 having a glass film 22 on its surface. Embedded in the surface of the glass film 22 is a coating of refractory particles 24. A final coating 26 of the polyester base enamel is applied over the refractory particles. Here again, the separate coatings provide the unique results of this invention. In shaping this conductor, as by winding, the glass and the refractory oxides may crack and thereby tend to expose the conductor. However, the enamel holds it all in place. After shaping, the shaped coated conductor is heated, as in an oven, to about 450° C. and maintained until substantially all of the organic constitutents are removed. As a rule, heating in this fashion generally occurs in about ½ to 2 or more hours, and it may be accomplished in the presence of flowing air to remove the volatile constituents. Then the furnace or oven temperatures is raised sufficiently to re-fuse the glass. The glass again fuses to a continuous film and, simultaneously, more tightly binds the refractory material against its surface upon wetting that refractory material.

The invention will be described further in conjunction with the following specific embodiments in which the details are given by way of illustration and not by way of limitation.

Samples of inorganic insulated wire in accordance with this invention are made as follows: Several hundred feet of #18 A.W.G. alloy clad copper wire are coated at a rate of 5 ft. per minute with a slurry consisting of, by weight, 100 parts of lead borate glass of minus 325 mesh (Tyler), one part of methyl cellulose gum, and 200 parts of water. The glass is prepared by admixing 88 one part of nickel oxide thereto. These oxides are ground parts of lead oxide and 12 parts of boric oxide and adding and then fused at about 1000° C. The fused mixture is poured into water where it shatters to a frit. The resulting frit is ball milled to minus 325 mesh and is then made into a slurry as just indicated.

After the frit is applied to the wire, the wire is passed through a heated wire coating tower where the water is removed, leaving the methyl cellulose to hold the glass particles on the wire. The wire then is passed through a radio frequency heating coil where the coating is fused to form a smooth film of glass on the wire. Heat is supplied by a 5 kw. radio frequency generator operated at 540 ma. The wire temperature is, at these conditions, in the range of about 700° to 750° C. The resulting glass coated (0.05–0.7 mil coat) wire is cooled to handling temperature.

A polyester enamel is then prepared as follows: Into a reaction vessel equipped with external heating means, stirrer, thermometer and a nitrogen sparging tube with attached air condenser there are placed the following ingredients: 3400 grams of dimethylterephthalate, 3400 grams of dimethylisophthalate, 1355 grams of ethylene glycol, 2365 grams of 1,4-butanediol, 268 grams of glycerol, and 87.4 grams of titanium acetyl acetonate. The resulting mixture is heated relatively fast with stirring and nitrogen gas sparging until the temperature of the reaction mass reaches about 160° C. Thereafter, the temperature of the reaction mass is increased slowly at a rate of about 20° C. per hour until the temperature of the reaction mass reaches 275° C. This temperature of 275° C. is maintained for about one hour and a viscous, thread-forming resin is obtained The resin is then dissolved in a mixture of 8750 milliliters of cresol and 5250 milliliters of xylene. The resulting varnish or enamel solution has a resin solids content of about 40 percent.

Portions of the glass coated wire are immersed in the polyester enamel solution just described. This product is then once more passed through the wire coating tower to cure the enamel. During this stage, the temperature is maintained at about 400° C. At these conditions, a build-up of about 0.5 to one mil of enamel occurs and the resulting product is flexible and entirely suitable for high temperature applications where cut-through resistance is not particularly critical.

A portion of the enameled wire is then wrapped with a layer of thin continuous filament glass yarn (Industrial Specification #450 glass yarn), while a second portion is doubly served in this manner. These two portions of wire are then dipped into a mixture of equal parts of the above polyester resin enamel and the lead borate glass composition (88 percent PbO and 12 percent $B_2O_3$). These samples are baked at 300° C. in a wire tower at a speed of about 20 feet/minute. Typically, the build-up on the wire due to the coatings was 10 to 11 mils.

Two strands of each of the foregoing coated wires were then twisted together, as in the AIEE No. 57 electric strength test. They were then fired at 500° C. to burn off both organic enamels and to fuse the lead borate glass, thoroughly consolidating the insulation. Tests on these products showed that the twists had an average electric breakdown of 1300 volts at room temperature.

Another portion of the glass coated wire, prior to enameling, is treated as follows. A mixture of 50 parts of fused alumina particles ground to minus 300 mesh and 50 parts of water containing one percent of methyl cellulose is prepared. The blass coated conductor is passed through this mixture. It is then passed through the radio frequency heating coil, at the conditions indicated above, to again fuse the glass particles whereupon the alumina tightly adheres thereto in consequence of the molten glass wetting the alumina surfaces. This product is then coated with the polyester enamel solution as before, and is cured by heating at about 400° C.

Still another portion of the glass coated wire is treated with a mixture composed of 30 parts of ground mica (1000 mesh), 70 parts of water and one percent of methyl cellulose gum. The treated conductor is again fired to fuse the glass and tightly adhere the mica to the conductor. Then enamel is applied by immersing this conductor in the polyester enamel solution. Curing is accomplished at 400° C.

In each of the latter two examples, very high cut-through resistance is obtained largely due to the added separate layer of refractory constituents. The covering layer of enamel functions in these two examples in the exact manner as indicated above; that is, it provides a continuous, tough, flexible, coating that retains the glass and refractory constituents in place despite fracture that may occur upon handling and forming. In use, this enamel is removed by heating to the glass fusion temperature. Simultaneously, the overall inorganic insulation reforms to a continuous film and is further consolidated.

From the foregoing discussion and description it is apparent that the present invention provides an easily practiced method whereby inorganic insulated wires are readily produced and with confidence that a good continuous insulation film is provided and high cut-through resistance is experienced. All parts and percentages, unless otherwise, indicated or apparent, are by weight.

It will be appreciated that though the invention has been described with respect to specific materials and procedures, substitutions, changes and the like can be made without departing from its scope.

We claim:

1. A method of producing an insulated enameled conductor which comprises applying to a metallic conductor a first coating consisting essentially of a slurry containing a binder, water and a glass that is a good electrical insulator at a temperature of about 500° C. that has a fusion temperature on the order of about 600° to 750° C., that has a coefficient of thermal expansion high enough to prevent cracking, crazing and spalling of the fused glass at temperatures ranging up to 500° C., and that adheres to the surface of the conductor while being bent in a semicircle with a radius of at least 25 times the diameter of the uncoated conductor, drying the resulting glass coated conductor, heating the glass coated conductor to a temperature sufficient to fuse the glass particles thereon to a continuous film, coating the resulting glass film-containing conductor with a polyester resin enamel having a decomposition temperature not exceeding the fusion temperature of the glass, thereafter shaping the enameled conductor and heating the shaped conductor to a temperature sufficient to drive off the organic constituents of said enamel and refuse said glass.

2. A method in accordance with claim 1 in which the glass comprises, by weight, about 80 to 92 percent of lead oxide and 20 to 8 percent of boric oxide.

3. A method of producing an insulated electrical member which comprises applying to a metallic conductor a coating of glass particles, fusing said glass particles to a continuous film on said conductor, applying to the surface of the glass film inorganic refractory particles, re-fusing the glass film on the conductor sufficiently to wet the refractory particles and bind them thereto, coating the refractory particles with a polyester resin, shaping the coated conductor to form an electrical member having a desired shape, then heating the shaped electrical member to a temperature sufficient to drive off the organic constituents of said coating and re-fuse the glass to a continuous film over said conductor.

4. A method of producing an inorganic insulated electrical conductor comprising forming a slurry of finely divided glass particles, the glass being a good electrical insulator at a temperature up to about 500° C., having a fusion temperature of about 600° to 750° C., having a coefficient of thermal expansion sufficiently high to prevent cracking crazing and spalling of the fused glass at temperatures up to about 500° C., and the glass adhering, in the fused state, to the surface of a conductor while being bent in a semicircle with a radius of at least 25 times the diameter of the conductor being coated, coating a metallic conductor with said slurry, drying the coated conductor and then heating it to a temperature of 600° to 750° C. to fuse the glass particles to a continuous glass film on said conductor, coating the surface of the glass film with refractory particles and then heating the refractory particle coated glass film sufficiently to cause the glass to wet the refractory particles, thereafter applying a polyester resin enamel coating to the refractory coating, shaping the resulting conductor to a desired form, heating the shaped product at a temperature of about 300° to 460° C. for a period sufficient to decompose and volatilize the organic constituents of the enamel, and then raising the temperature of the shaped coated glass conductor to about 600° to 750° C. to reestablish continuity of the glass film.

5. A method in accordance with claim 4 in which said glass comprises 80 to 92 percent of lead oxide and 20 to 8 percent of boric oxide.

6. An electrical conductor insulated with an inorganic insulation comprising a first coating consisting essentially of a fused glass film directly on the surface of the metallic conductor, refractory particles covering the surface of the glass film and used thereto, and an organic coating over the refractory particles whereby the fused glass coating is held in place while working the conductor to a desired form and can be re-fused to a continuous film if damaged, said glass comprising, by weight, about 80 to 92 percent lead oxide and 20 to 8 percent of boric oxide and said organic coating comprising a polyester resin.

7. A method of producing an insulated enameled electrical conductor which comprises applying to a metallic conductor a first coating consisting of essentially of a slurry containing an organic binder, water and a glass-frit of a glass that is a good electrical insulator at a temperature of about 500° C., has a fusion temperature on the order of about 600° C. to 750° C., has a coefficient of thermal expansion high enough to prevent cracking, crazing and spalling of the fused glass at temperatures ranging up to 500° C. and adheres to the surface of the conductor while being bent in a semicircle with a radius of at least 25 times the diameter of the uncoated conductor, drying the resulting glass-frit coated conductor, heating the coated conductor to a temperature sufficient to fuse the glass particles thereon into a continuous film, coating the resulting glass film coated conductor with an organic polyester resin having a decomposition temperature not exceeding the fusion temperature of the glass, wrapping a filamentary glass yarn about the resin and glass film coated conductor, coating the glass yarn with an organic polyester resin, forming the thus produced electrical conductor to a desired shape and heating the shaped electrical conductor to a temperature sufficient to drive off the organic constituents and re-fuse the glass to a continuous film over said conductor.

8. A method of coating metallic electrical conductor which comprises applying a coating of glass particles to a metallic conductor, fusing said glass particles into a continuous film on said conductor, coating the fused glass film with a polyester resin, wrapping a filamentary glass yarn about the resin coating, coating the glass yarn with an admixture of polyester resin and refractory frit, heating the conductor to cure the polyester resin, shaping the electrical conductor to a desired shape and heating the shaped electrical conductor to a temperature sufficient to drive off the polyester resin constituents of said coatings and re-fuse the glass to a continuous film over said conductor.

9. An insulated electrical conductor comprising a metallic conductor, a fused glass coating on the surface of the metallic conductor, a polyester resin film deposited over the fused glass coating, a filamentary glass yarn wrapped about said polyester resin film and a final coating of an admixture of polyester resin and refractory particles deposited thereabout, whereby the conductor may be formed into a desired shape with the glass coating held in place during the forming so that the glass coating may be re-fused into a continuous film if damaged during the forming.

10. An insulated electrical conductor comprising a metallic conductor, a fused glass coating deposited on the surface of the metallic conductor, a filamentary glass yarn wrapped about said glass coating and a coating of a refractory-filled polyester resin deposited thereabout, whereby the glass coating is held in place during working of the conductor to a desired form and can be fused to a continuous film if damaged during working, said glass having a fusion temperature from about 600° C. to 750° C.

11. The electrical conductor of claim 10 in which the glass coating composition comprises, by weight, about 80 to 92% lead oxide and 20 to 8% boric oxide.

References Cited
UNITED STATES PATENTS

| | | | |
|---|---|---|---|
| 2,459,653 | 1/1949 | Keyes | 174—121 |
| 3,071,846 | 1/1963 | Weslowski | 29—155.57 |
| 3,089,787 | 5/1963 | Sattler | 174—120 X |
| 3,222,219 | 12/1965 | Saunders | 117—218 |

LEWIS H. MYERS, *Primary Examiner.*

E. GOLDBERG, *Assistant Examiner.*